May 11, 1937. E. LEVIGTON 2,080,282

EYEGLASS FRAME

Filed Dec. 31, 1935

WITNESSES

INVENTOR
Emanuel Levigton
BY
ATTORNEYS

Patented May 11, 1937

2,080,282

UNITED STATES PATENT OFFICE 2,080,282

EYEGLASS FRAME

Emanuel Levigton, New York, N. Y.

Application December 31, 1935, Serial No. 57,028

1 Claim. (Cl. 88—47)

This invention relates to eyeglass frames either of the skeleton type or the complete type, and has for an object to provide an improved construction wherein a pleasing appearance is presented and one which will brace the lenses transversely and also circumferentially.

Another object of the invention is to provide an eyeglass lens of any suitable type wherein the temple carrying ends have lens straddling bracing prongs on the straps for bracing and holding the lens against transverse strain.

Another object is to provide an eyeglass frame wherein the bridge structure is provided with substantially usual shaped straps having straddling prongs for straddling part of the lens and acting as a transverse brace therefor.

An additional object is to provide an eyeglass frame of the skeleton type or other type wherein either or both the ends and bridge piece are provided with circumferential braces extending to near the outer ends of the respective straps to brace the parts circumferentially when transmitting strain.

Figure 1:
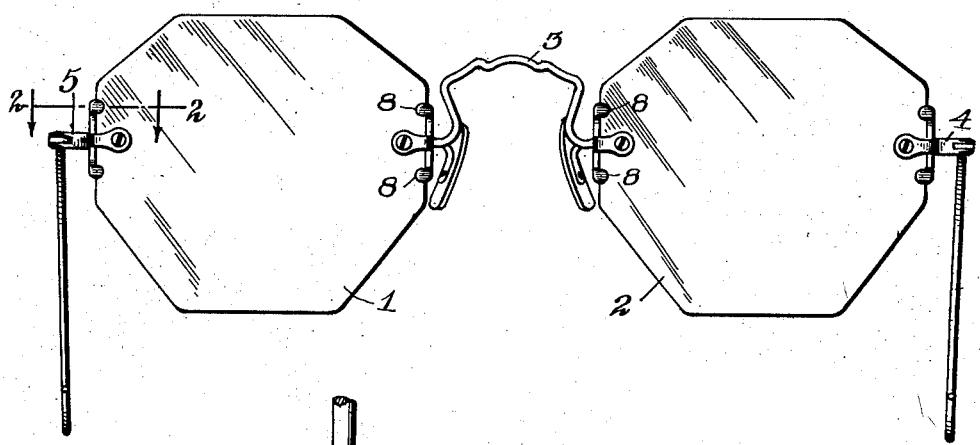
Fig. 1 is a view in elevation showing a pair of eyeglasses with a skeleton frame formed according to the present invention.

In the accompanying drawing a pair of eyeglasses has been disclosed including a skeleton eyeglass frame. The invention has been applied to this frame but it will be evident that it could be applied to other forms of frame without departing from the spirit of the invention, and also the frame could be applied to the shape of lenses shown in Fig. 1 of the drawing or to any other desired shape of lenses. Also in applying the invention the same could be applied only to the end pieces or only to the bridge structure, although in many cases it is applied to all of these parts as illustrated particularly in Fig. 1.

Referring to the accompanying drawing by numerals, 1 and 2 indicate the respective lenses, 3 the bridge structure, and 4 and 5 the ends.

Figure 2:
Fig. 2 is a fragmentary sectional view through Fig. 1 approximately on the line 2—2, the same being shown on an enlarged scale.
Figure 3:
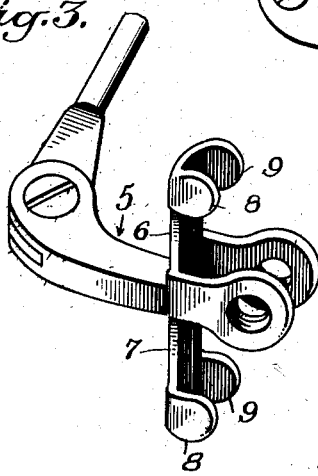
Fig. 3 is a perspective view of the structure shown in Fig. 2.

As the ends are identical the description of one will apply to both. The end 5 has been shown more or less in detail in Figs. 2 and 3, and referring particularly to these figures it will be seen that the respective straps 6 and 7 forming part of end 5 have prongs or ears 8 and 9 at each end. If desired, these prongs could be positioned intermediate the ends, although ordinarily they are made at the ends and are spaced a proper distance apart to snugly fit against the respective faces of the lens 1. It will therefore be seen that these prongs straddle the lens 1 as shown in Fig. 2 and somewhat pinch the lens so as to brace the end 5 or rather to brace the lens when strain is brought to bear thereon through end 5. These prongs act as transverse braces spaced any desired distance on each side of the center of the end 5 so as to give a desired distribution of strain or bracing action to the lens in a transverse direction. The same construction is provided at the respective ends of the bridge 3 and therefore no additional description will be necessary, but the same numerals will be used to indicate similar parts. It is of course evident that the ends 4 and 5 could be constructed as just described and a different form of bridge used than shown in Fig. 1. It will be apparent that the prongs 8 and 9 and associated parts could be used on part of the frame and left off the other part or could be used throughout as shown in Fig. 1 of the drawing. In addition it will be seen that the arrangement will protect the lens against torsional strain around the screw.

Figure 4:
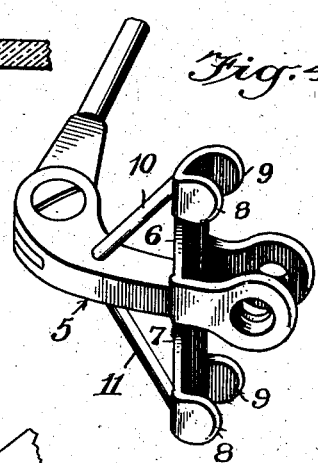
Fig. 4 is a perspective view similar to Fig. 3 but showing an improved brace structure.
Figure 5:
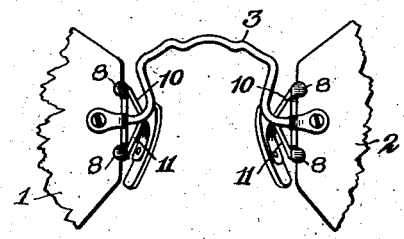
Fig. 5 illustrates in elevation part of a pair of lenses with a connecting bridge formed with straps having transverse lens braces and diagonally positioned bars acting as circumferential braces.

Under some circumstances it is desirable to not only provide the transverse braces 8 and 9 as just described, but to provide what may be termed circumferential braces, namely the bracing bars 10 and 11 as shown in Figs. 4 and 5. As shown in Fig. 4, these bars have been illustrated on the end 5, while in Fig. 5 they have been illustrated on the bridge structure 3. These bars may be soldered or otherwise rigidly secured in place as illustrated, and when strain is exerted through the temple or through part of the end 5 in a circumferential direction these bars will take up or rather distribute the strain in a desired manner so that no part of the end will be unduly under tension, and also so that the strain will be evenly distributed circumferentially of the lens. If desired the bars 10 and 11 could be eliminated from the nose piece and used only on the ends, or the reverse could be true, although ordinarily where they are used on the ends they are also used on the bridge. Where all of the bracing members are used as shown in Figs. 4 and 5, the respective lenses are braced transversely and also circumferentially, thus protecting as far as possible the screw which extends through the lens. Without these bracing members the strain on the lenses usually presses the straps from their normal position and allows a slight swinging or pivotal movement around the retaining screw. This produces a loose lens and also causes an enlargement of the hole through which the screw extends. In the present invention the straps 6 and 7 are held against bending away from the lens by the bracing bars 10 and 11, and consequently this swinging movement can not take place. While this is being accomplished the prongs or straddle members 8 and 9 are transmitting or distributing strain to the lens in a transverse direction whereby these members act as transverse braces and the bars 10 and 11 act as circumferential braces.

It will be understood that the invention is directed to any structure of eyeglass end or bridge provided the same is capable of receiving the prongs 8 and 9 and the respective bracing bars 10 and 11. The particular type or shape of the lens is unimportant as the invention may be applied to any and all types of lenses and also any and all sizes and shapes, and when applied will function in the same manner to give the desired protection and bracing action.

I claim:

A clip for connecting the parts of a skeleton frame to the lens, said clip comprising a bar or seat of a length and width to make contact with a substantial portion but not the entire edge of a lens in the plane of the lens, a pair of apertured lugs projecting from said bar or seat in the same direction and at right angles thereto and coincident with each other, said lugs being spaced apart for a distance equal to the thickness of the lens, one of the apertures in said lugs being threaded to receive a threaded screw engaging the apertures in both lugs, and said bar or seat above and below the apertured lugs having pairs of opposed clips integral with the seat projecting from the free ends thereof, said clips projecting from the edges of the bar or seat in the same direction as the apertured lugs and spaced from each other a distance equal to the thickness of the lens to receive the edge thereof and pinch the lens, said clips also acting to brace the lens and protect the lens and the apertured lugs from torsional strains.

EMANUEL LEVIGTON.